April 1, 1947.  S. PELLERANO  2,418,423
SHAPING OF VINYLIDENE CHLORIDE POLYMERS WHILE IN
CONTACT WITH CADMIUM OR CADMIUM BASE ALLOYS
Filed Sept. 13, 1944
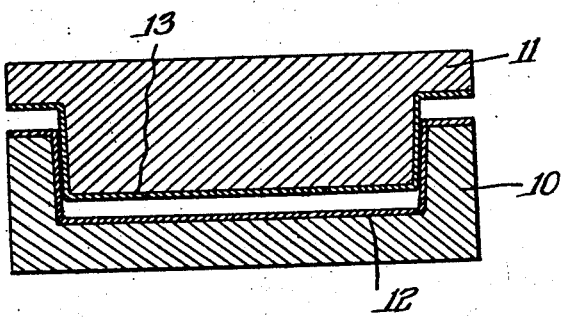
INVENTOR.
SILVIO PELLERANO
By Brown, Jackson, Boettcher & Dienner
ATTYS.

Patented Apr. 1, 1947

2,418,423

UNITED STATES PATENT OFFICE 2,418,423

SHAPING OF VINYLIDENE CHLORIDE POLYMERS WHILE IN CONTACT WITH CADMIUM OR CADMIUM BASE ALLOYS

Silvio Pellerano, Muskegon, Mich., assignor to The Kaydon Engineering Corporation, Muskegon, Mich., a corporation of Michigan Application September 13, 1944, Serial No. 553,840

2 Claims. (Cl. 18—55)

This invention relates to the handling, particularly the molding or shaping or fabricating, of vinylidene chloride polymers and copolymers. The copolymers may be of various types as, for example, those made by copolymerizing vinylidene chloride with vinyl acetate, vinyl chloride, styrene, divinyl ether, or alkyl methacrylates such as methyl methacrylate. For convenience, the polymers and copolymers, with or without plasticizers or other added materials, are referred to generically as vinylidene chloride polymers.

Vinylidene chloride polymers are quite sensitive to certain elevated temperatures, tending to decompose with the evolution of hydrochloric acid and, in certain cases, to undergo an undesired change of color. This fact, coupled with the additional fact that, in the molten or fused state, the decomposition of the vinylidene chloride polymers is rapidly accelerated or catalyzed by metals such as iron, zinc, tin and various other materials, has introduced considerable difficulties in connection with the molding, shaping and fabricating of said vinylidene chloride polymers. In an effort to overcome the aforementioned difficulties, it has been proposed to form the various portions of the molding equipment or machinery, such as heating cylinder liners, the torpedoes or spreaders, nozzles and other parts of nickel or nickel-base alloys. Efforts to use such metals have not proven fully satisfactory due, among other factors, to elements of cost, difficulty of machining, and for other reasons with which those versed in the art are familiar and which, therefore, do not require further elaboration.

In accordance with the present invention, the decomposition of vinylidene chloride polymers, in the molten or fused condition, is prevented or substantially prevented by the use of cadmium or cadmium-base alloys. It has been found that decomposition of vinylidene chloride polymers in the molten or fused state is not accelerated or catalyzed if said molten or fused polymers are maintained in contact with cadmium or cadmium-base alloys. Advantage may be taken of this discovery in connection with the shaping or fabricating of the polymers, particularly with respect to molding, whether by compression, transfer, injection or extrusion. The present invention renders it possible to utilize existing equipment for molding or fabricating vinylidene chloride polymers simply by forming the surfaces, which come in contact with the molten or fused polymers, of cadmium, or cadmium-base alloys. This may be accomplished in a variety of ways, as disclosed hereafter. The utilization of the teachings of the present invention enables exceptionally satisfactory results to be achieved at low cost and without the necessity for using expensive machining procedures.

In the drawing, there is shown a simple form, in cross section, of a positive type mold embodying teachings of the present invention. This comprises a cavity block 10 and a cooperating force or plunger 11, each made of a suitable structurally strong material such as a carbon steel. The surfaces 12 and 13, with which the molten or fused vinylidene chloride polymer comes into contact, are made of cadmium, or cadmium-base alloys.

The principles of the present invention may be adapted to various types of molding or shaping or fabricating equipment for handling vinylidene chloride polymers. In all cases, as previously explained, the surfaces of those parts of the equipment which come into contact with the molten or fused polymers are of cadmium, or cadmium-base alloys. Thus, for example, the cylinder, screw, bridge and nozzle of extruding presses may be surfaced or faced with any of the aforesaid cadmium metals, and the same is true in the case of the liner, ram, torpedo and nozzle of injection molding machines, and the pot and plunger of transfer molding equipment.

While the parts of the equipment involved may be made from the solid metal, be it cadmium, or cadmium-base alloy, it is usually unnecessary to do so since a surface layer or coating may be applied to the base part which, in the usual case, is a carbon steel. The surface layer may be applied, for example, by welding or brazing or otherwise uniting a sheet of cadmium, or cadmium-base alloy to a steel base member to form, in effect, a lining or coating on the steel base member. It is most convenient, however, in the usual case, to electroplate a layer of the cadmium, or cadmium-base alloy, on the steel base member, the electrodeposit being of sufficient thickness to withstand, for a substantial period of time, the abrasive conditions encountered in the use of the equipment during molding operations.

Cadmium or cadmium-base alloy coatings may be electrodeposited from aqueous solutions using known plating baths and operating in accordance with known electroplating practices.

Where reference is made to cadmium-base alloys, it is intended to cover such alloys in which cadmium is present in the alloy in largely predominating amounts, generally of the order of 80% to 95%. Typical cadmium-base alloys are, for example, the following:

(1) 80%-95% silver
    5%-20% cadmium
(2) 80%-95% cadmium
    5%-20% silver

As illustrative of the results attainable through the practice of the present invention, reference may be made to the production of rigid sheets from a vinylidene chloride copolymer. By using dies plated with cadmium or cadmium-base alloy, almost translucent sheets of the natural color of the copolymer are readily obtained without any decomposition of the molten vinylidene chloride copolymer.

What is claimed and desired to be protected by United States Letters Patent is:

1. In the handling of vinylidene chloride polymers wherein said polymers are converted to a molten or fused condition, the step which comprises maintaining said polymers, while in the molten or fused condition, in contact with a member selected from the group consisting of cadmium and cadmium-base alloys whereby decomposition of said polymers is substantially prevented.

2. In the molding or shaping of vinylidene chloride polymers wherein, during said treatment, said polymers are converted to a molten or fused condition, the step which comprises maintaining said polymers, during such portion of the molding or shaping thereof wherein said polymers are in a molten or fused condition, in contact with a member selected from the group consisting of cadmium and cadmium-base alloys whereby decomposition of said polymers is substantially prevented.

SILVIO PELLERANO.

REFERENCES CITED

The following references are of record in the file of this patent:

UNITED STATES PATENTS

| Number | Name | Date |
|---|---|---|
| 439,198 | Schulz-Berge | Oct. 28, 1890 |
| 1,329,312 | Roberts | Jan. 27, 1920 |
| 1,529,803 | Moyer et al. | Mar. 17, 1925 |
| 1,544,828 | Fuchs | July 7, 1925 |
| 2,259,524 | Kistler | Oct. 21, 1941 |
| 2,160,933 | Wiley | June 9, 1939 |

FOREIGN PATENTS

| Number | Country | Date |
|---|---|---|
| 282,787 | British | Mar. 28, 1929 |